Sept. 27, 1960   O. L. UTT ET AL   2,954,462
VEHICLE LENGTH DETECTOR
Filed June 25, 1956   2 Sheets-Sheet 1

INVENTORS.
Orval L. Utt and
John W. Ericson
BY
W. L. Stout
THEIR ATTORNEY

INVENTORS.
Orval L. Utt and
John W. Ericson
BY W. L. Stout
THEIR ATTORNEY

United States Patent Office 2,954,462
Patented Sept. 27, 1960

2,954,462

VEHICLE LENGTH DETECTOR

Orval L. Utt, Monroeville, and John W. Ericson, Verona, Pa., assignors to Westinghouse Air Brake Company, Wilmerding, Pa., a corporation of Pennsylvania Filed June 25, 1956, Ser. No. 593,540

9 Claims. (Cl. 246—1)

Our invention relates to a method and means for measuring the lengths of vehicles or a group of coupled vehicles as they move along a trackway.

In classification yards, railway cars are classified by releasing single cars or groups of coupled cars from a hump or crest in the yard and permitting them to coast down an incline. As the cars descend the incline they are directed, by means of preselected switching, to one of several yard tracks where new trains, destined for different locations, are being formed. As each car descends the hump, it passes through braking devices usually referred to as car retarders, which reduce the speed of the car to some predetermined velocity. The predetermined velocity is selected so that the car may coast along the yard track to where it is directed and couple with the preceding car on the track without sufficient impact to damage the merchandise contained within the cars.

In the present era of making such classification yards automatic, it has been found that there is a need for determining the length of each car or group of coupled cars. The length measurement is one of several quantities needed for computing the predetermined velocity at which the car should be released from the retarder.

Since the degree to which the yard tracks are filled varies from time to time, it is necessary to release a car destined for a yard track that is nearly empty with a greater velocity than is necessary if the yard track is nearly full. The reason for this is obvious since, in the first case, a car must travel a longer distance along the track before coupling with the preceding car than in the second case. Therefore, the degree of fullness of the yard tracks is another of the quantities needed in computing the velocity at which the car should be released from the retarder. The length measurement provides a convenient method for measuring the degree of fullness of the yard tracks.

Therefore it is an object of our present invention to provide a means for measuring the length of a vehicle in motion.

A further object of our invention is to provide means for measuring the degree of fullness of the tracks associated with a classification yard.

In practicing our invention, we measure the velocity of each vehicle as it moves along a trackway by means of radar apparatus adapted to operate in accordance with the Doppler principle. The radar apparatus provides a signal, usually referred to as a beat frequency signal, that is proportional to the velocity of the vehicle. The number of beat frequency cycles that occur during a time interval corresponding to that required for the vehicle to pass a given location along the trackway represents the length of the vehicle. Accordingly, the number of cycles that occur during this time interval are measured by an integrating device to provide a measure of the length of the vehicle. The length measurement may be used for controlling the retardation of the retarder directly. Also the length measurement of all vehicles destined for a particular track may be transferred to a register associated with the track to provide a measurement of the degree of fullness of the yard track.

Other objects and features of our invention will become apparent from the following specification when taken in connection with the accompanying drawings.

Referring now to the drawings.

Similar reference characters refer to similar parts in each of the several views.

Figure 1:
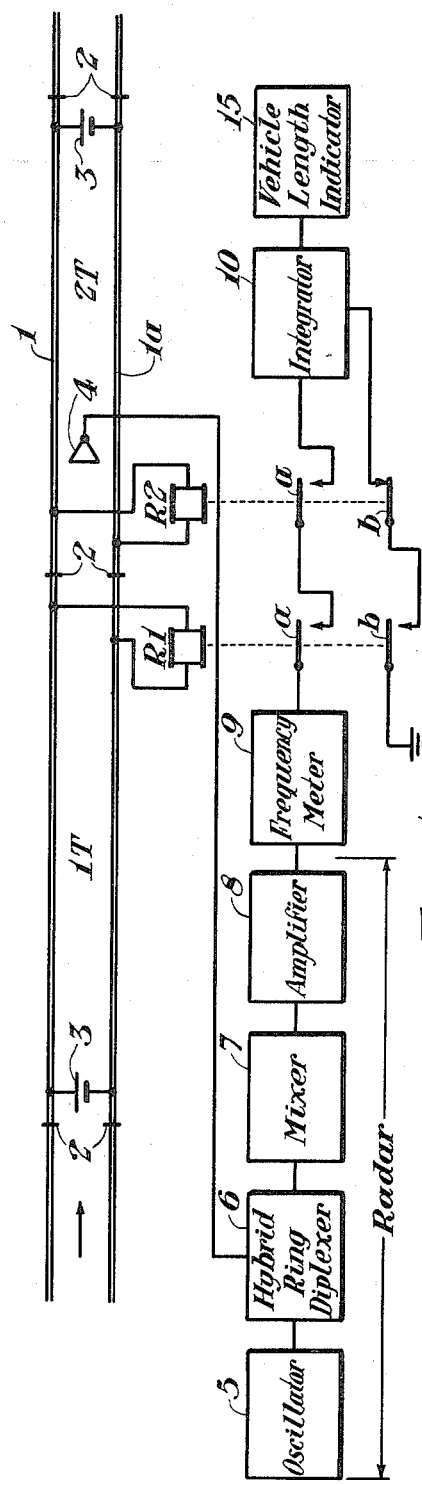
Fig. 1 is a diagrammatic view of a first embodiment of our invention in which a length measurement is provided in the form of a continuous or analog quantity.

Referring now to Fig. 1, there is shown a section of railway track comprising track rails 1 and 1a. The track rails are divided into two track sections by means of insulated joints 2 to form two adjacent track sections designated by the reference characters 1T and 2T. One end of each track section is provided with a suitable source of electrical energy, here shown as a battery 3. Track relays R1 and R2, suitable for operating in connection with the source of energy, are connected across the opposite ends of the track sections 1T and 2T, respectively. Each track section is of such length that it cannot be spanned by a single vehicle.

A radar antenna 4, located between the track rails, is supplied with high frequency electromagnetic energy. The antenna radiates and directs this energy along the trackway so as to impinge upon a vehicle moving across the insulated jointst separating the two track sections. The antenna also receives energy reflected to it by a vehicle moving along the trackway.

The normal direction of the movement of traffic along the trackway is from left to right as shown by the arrow. It is to be understood, however, that the traffic may be moving in either direction and the apparatus may function in the manner described herein.

The radar apparatus may be of conventional design and adapted to be responsive to the Doppler principle. It comprises an oscillator 5 which supplies high frequency energy to a hybrid ring diplexer 6. The diplexer directs a major portion of this energy to the antenna to be radiated and the remainder of the energy is directed to a mixer 7. Some of the radiated energy impinges upon a vehicle moving along the trackway and a portion thereof is reflected toward the antenna where it is received and directed to the diplexer. The diplexer directs this energy to the mixer 7 where it is combined with the energy direct from the oscillator. These energies are combined in such a manner as to produce a signal having a frequency that is the difference between the frequency of the energy reflected by the vehicle and the energy direct from the oscillator. This signal is usually referred to as a beat frequency signal and the frequency of the signal represents the velocity of the vehicle. This signal is amplified in an amplifier 8 which supplies the amplified signal to a frequency meter 9. The frequency meter provides an output voltage having a magnitude proportional to the frequency of the signal. The voltage derived by the frequency meter, therefore, represents the velocity of the vehicle.

This voltage is directed to an integrator 10 through a series arrangement of a back contact *a* on relay R1 and a back contact *a* on relay R2. The circuit to the integrator is completed only during the time that a vehicle is shunting both track sections simultaneously and, therefore, is completed during a time interval corresponding to that required for the vehicle to pass the insulated joints 2 separating the two track sections. During this interval, the integrator responds to the voltage from the frequency meter to derive a voltage that is proportional to both the velocity of the vehicle and the time interval required for the vehicle to pass the common junction of the two track sections. The integrator may be of conventional design, such as a resistance capacitance network or any other suitable integrating device.

Prior to the interval that the length measurement is to be made, it is necessary to cancel any previous measurement that may be registered in the integrating device. One suitable means for effecting the cancellation is shown in Fig. 1. The cancellation is provided, as herein shown, with a circuit arrangement consisting of a series arrangement of a back contact b on relay R1 and a front contact b on relay R2. A circuit is completed, through these contacts, to the integrating device just prior to the time interval in which a length measurement is to be made, that is to say that the circuit is completed while a vehicle is shunting track section 1T and while track section 2T is vacant. It should be noted that if the normal movement of traffic is from right to left, the contact on relay R2 should be made a back contact and the contact on relay R1 should be made a front contact to effect the cancellation. The completing of this circuit restores the integrator to its initial position by discharging the capacitor or storage apparatus associated with the integrator.

The output voltage from the integrator represents the length of the vehicle. This voltage may be impressed upon a vehicle length indicator 15, which may be of any suitable type such as a meter for measuring the voltage derived by the integrator and may be calibrated in terms of length dimensions. Moreover, the voltage from the integrator may be used to control the retardation of the car retarders through suitable control means.

Figure 2:
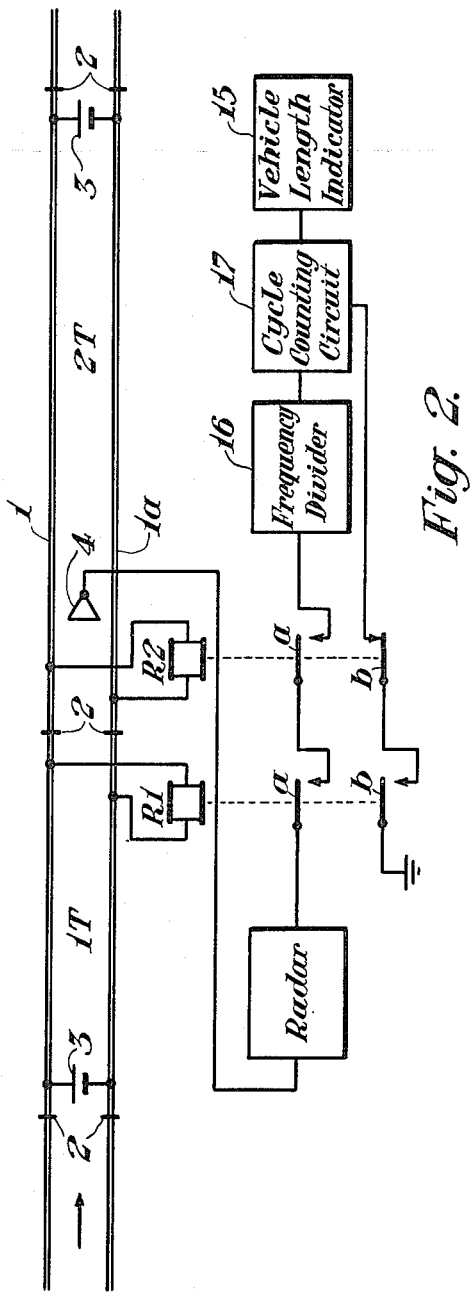
Fig. 2 is a diagrammatic view of a modification of the apparatus in Fig. 1 in which the length measurement is provided in the form of a digitized quantity.

A second form of our vehicle length detector is shown in Fig. 2. Referring now to Fig. 2, the frequency meter and integrator of Fig. 1 is shown replaced by a frequency dividing circuit 16 and a cycle counting circuit 17. Since each cycle of the beat frequency signal represents a definite length measurement, the length of the vehicle may be measured by actually counting the number of cycles of the beat frequency signal that occur during the time interval that the vehicle shunts both track sections simultaneously. Thus, the frequency counting circuit is essentially an integrator.

Inasmuch as it may not be necessary to measure the length of the vehicle as accurately as would be attained by counting each cycle of the beat frequency signal, a submultiple of this frequency may be obtained with the use of a frequency dividing circuit. The cycles of the submultiple frequency are counted with a cycle counting circuit. The cycle counting circuit may be conventional design such as a chain of relays or any other suitable device for registering the total number of cycles applied thereto. The number of cycles registered by the cycle counting circuit during the time required for the vehicle to pass the common junction of the two track sections represents the length of the vehicle and may be indicated visually with a cut length indicator such, for example, as a plurality of lights controlled in accordance with the energization of the relays of the frequency counting circuit.

Again, as in Fig. 1, any length measurement that may be registered in the cycle counting apparatus should be cancelled before a new measurement is made. As described in connection with Fig. 1, one suitable means for effecting the cancellation comprises a circuit made up of a back contact b of relay R1 and a front contact b of relay R2. This circuit is completed just prior to the time interval in which the length measurement is to be made and, therefore, may be employed to restore the relays of the cycle counting circuit to their initial position. Again it should be noted that if the normal movement of the traffic is from right to left, the contact on relay R1 should be made a front contact and the contact on relay R2 should be made a back contact.

Figure 3:
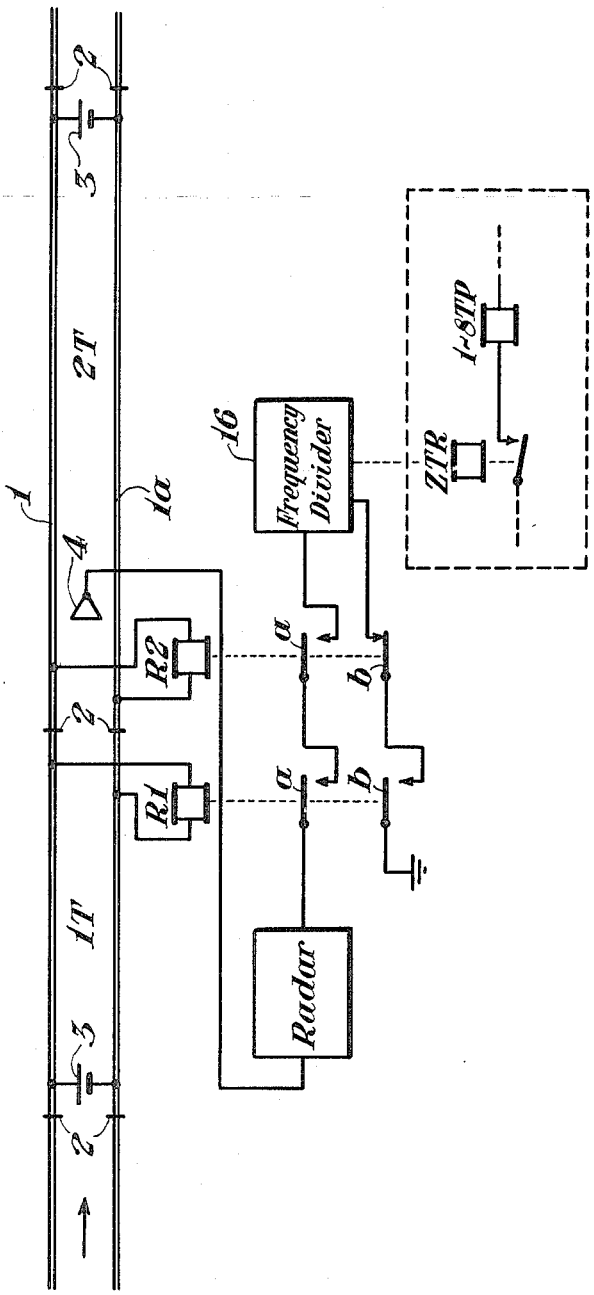
Fig. 3 is a fragmentary view of apparatus embodying our invention for ascertaining the degree of fullness of the yard tracks from the vehicle length measurements.

Referring now to Fig. 3, there is shown a means for measuring the degree of fullness of the yard tracks. As in Fig. 2, the radar apparatus is connected to the frequency dividing circuit during an interval corresponding to the time required for the vehicle to pass the common junction of the track sections. The number of cycles of the beat frequency signals that occur during this interval represents the length of the vehicle. This provides a convenient method for measuring the degree of fullness of each yard track.

In accordance with our invention, the degree of fullness of the yard tracks is ascertained by providing each track with a register associated with the track. The registers consist of a means for summing the total number of cycles, derived with the frequency dividing circuit, for all cars destined for any one yard track. Therefore, to measure the fullness of the tracks, it is only necessary to connect the frequency dividing network to the register associated with the yard track to which the vehicle is destined during the time that the vehicle is passing over the common junction of the two track sections. One suitable means for selecting the track to which the vehicle is destined and which shows a means for registering the total number of cycles is shown and described in a co-pending application Serial No. 584,208, filed May 11, 1956, by Benjamin Mishelevich and Sih Hsuin Tsiang which application is assigned to assignee of the present invention. The block indicated by a broken line in Fig. 3 represents symbolically the circuit included with the application and the relays ZTR and 1–8TP shown diagrammatically in the block represents relays designated by the same reference characters in the circuit of the application. As shown in Fig. 1 of application Serial No. 584,208, the degree of track fullness is ascertained by counting the axles of all vehicles directed to each yard track. Each time that a pair of wheels and an axle passes over a short track section designated by the reference character ZT, a relay designated by the reference character ZTR is released. The relay is normally energized and is released during the time required for the wheels and axles of a vehicle to traverse the short track section ZT. A sequence of a release followed by an energization of this relay represents a single axle count. The axle counts are directed to registers associated with the yard tracks, by means of suitable track switching circuits associated with the classification yard to provide a measure of the degree of fullness of the yard tracks.

In connection with Fig. 3 of our invention, the frequency dividing network is shown, symbolically, connected to the relay ZTR. The relay is thereby energized each time that a predetermined number of cycles of the beat frequency signal have occurred. The predetermined number of cycles is determined by the factor with which the frequency divider circuit reduces the frequency of the beat frequency signal and may be chosen so as to give any degree of accuracy desired of the length measurement. After the predetermined number of cycles have been applied to the frequency dividing circuit, the relay is energized. This indicates that a certain length measurement has been made, and the information is transferred to the register associated with the yard track to which the vehicle, whose length measurement is being measured, is destined. Since the apparatus for transferring this information to the registers and the registers themselves are not a part of our present invention, they will not be discussed herein and reference should be made to the above mentioned application for a description and an understanding of their operation.

Although we have herein shown and described two forms of a vehicle length detector and one form of apparatus for measuring the degree of fullness of the yard tracks of a classification yard, it is to be understood that various changes and modifications may be made therein within the scope of the appended claims without departing from the spirit and scope of our invention.

Having thus described our invention, what we claim is:

1. A method for determining the length of a moving object comprising the steps of deriving a signal having a frequency proportional to the velocity of the object, registering the passage of the object past a given location along its pathway, and counting the number of cycles of said frequency that occur during the time interval of the passage past said location to indicate the length of said object.

2. A vehicle length detector comprising radar means for providing a beat frequency signal that represents the velocity of a vehicle, position detecting means for registering the passage of said vehicle past a given location along its pathway, and cycle counting means connected to said radar apparatus by said position detecting means during the time interval of said passage for counting the number of cycles of said beat frequency signal that occur during said time interval.

3. Apparatus for measuring the length of a moving object comprising radar means for providing a signal having a frequency proportional to the velocity of said object, position detecting means for registering the passage of the object past a given location along its pathway, and an integrating network connected to said radar apparatus by said position detecting means during the time interval of said passage for counting the number of cycles of said frequency that occur during said time interval.

4. Apparatus for measuring the length of a vehicle moving along a trackway comprising means for providing a signal having a frequency proportional to the velocity of said vehicle, first and second adjacent electrically independent track circuits, each of said circuits comprising a track relay and a source of energy, an integrating network, and means controlled by said track relays when both track circuits are occupied for connecting said frequency determining means to said integrating network whereby the number of cycles of said frequency that occur during the time interval that both track circuits are occupied simultaneously is measured.

5. Apparatus for measuring the length of a vehicle moving along a trackway comprising radar means for measuring the velocity of said vehicle and for providing a signal having a frequency proportional to said velocity, a cycle counting means, and a first and a second adjacent track circuit each provided with occupancy detecting means for connecting said cycle counting means to said radar apparatus during the time interval that both track circuits are shunted simultaneously, and means controlled by said occupancy detecting means when said first track circuit is occupied and said second track circuit is unoccupied for cancelling any previous count that may be stored in said cycle counting means.

6. Apparatus for measuring the length of a vehicle moving along a trackway comprising radar means for providing a signal having a frequency proportional to the velocity of the vehicle along said trackway, a position detecting means for registering the passage of said vehicle past a given location along said trackway, a frequency measuring means for providing a voltage proportional to said frequency, an integrating network connected to said frequency measuring means by said position detecting means during the time interval of said passage, and an indicator connected to said integrating network for displaying a visual indication of the length of said vehicle.

7. Apparatus for measuring the degree of fullness of the yard tracks associated with a classification yard comprising radar means for providing a signal having a frequency proportional to the velocity of each vehicle destined for said tracks, a first and second adjacent electrically independent track circuit each comprising a track relay and a source of energy, a register means associated with each yard track for registering the fullness of each track, and means controlled by said relays when both said track circuits are occupied for connecting said radar apparatus to the register associated with a track to which a car is destined during the time required for said vehicle to pass a given location along its trackway whereby the degree of fullness of the yard tracks is ascertained.

8. An object length detector, comprising, in combination, speed measuring means for deriving a first signal in accordance with the speed of a moving object, integrating means for producing a second signal in accordance with the time integral of an applied signal, switching means for applying said first signal to said integrating means, and means responsive to the passage of the object past a fixed point for actuating said switching means.

9. A track fullness detector, comprising, in combination, timing means for registering the passage of vehicles past a predetermined point on a track having a storage region, means for measuring the velocity of vehicles passing said point, integrating means controlled by said registering means and responsive to said measuring means for producing a signal in accordance with the integral of said measured velocity over the time of said passage, and means for accumulating signals from said integrating means to indicate the total length of vehicles in said storage region.

References Cited in the file of this patent

UNITED STATES PATENTS

| | | |
|---|---|---|
| 1,586,989 | Haines | June 1, 1926 |
| 2,045,201 | Rabourdin | June 23, 1936 |
| 2,067,147 | Preston | Jan. 5, 1937 |
| 2,346,518 | Tizzard | Apr. 11, 1944 |
| 2,411,573 | Holst | Nov. 26, 1946 |
| 2,415,168 | Gieseke | Feb. 4, 1947 |
| 2,467,455 | Georg | Apr. 19, 1949 |
| 2,629,865 | Barker | Feb. 24, 1953 |